T. F. McGRATH.
APPARATUS FOR EXTRACTING VALUES FROM FLUE DUST.
APPLICATION FILED FEB. 2, 1915. RENEWED MAY 16, 1917.
1,236,581.
Patented Aug. 14, 1917.
2 SHEETS—SHEET 1.
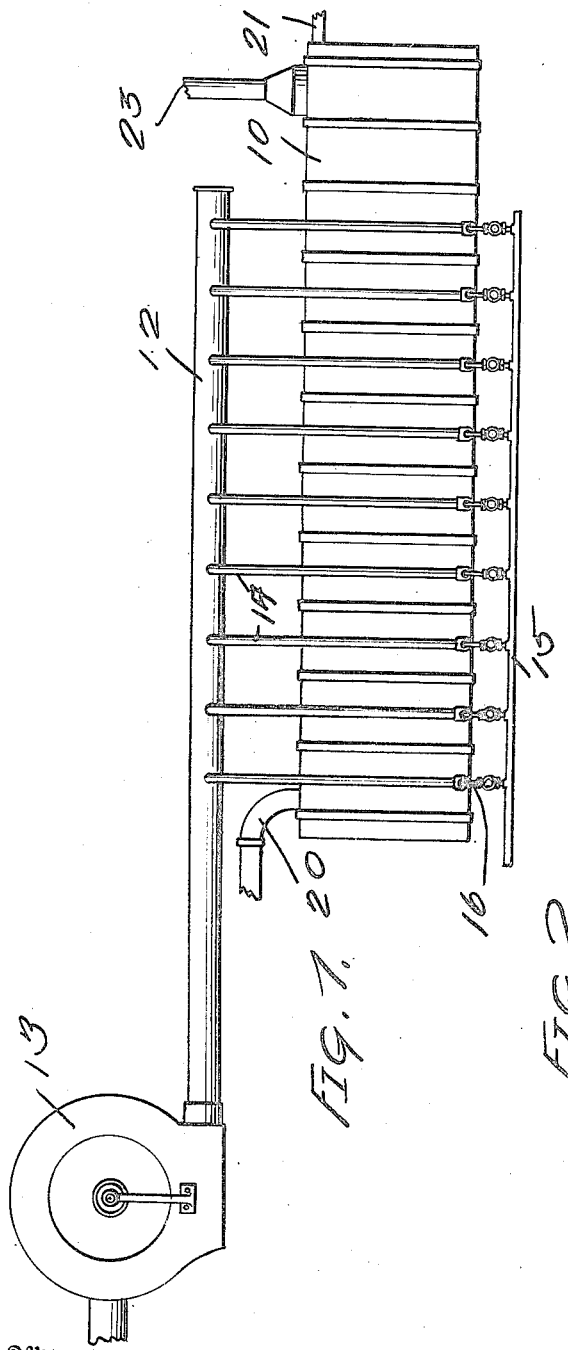
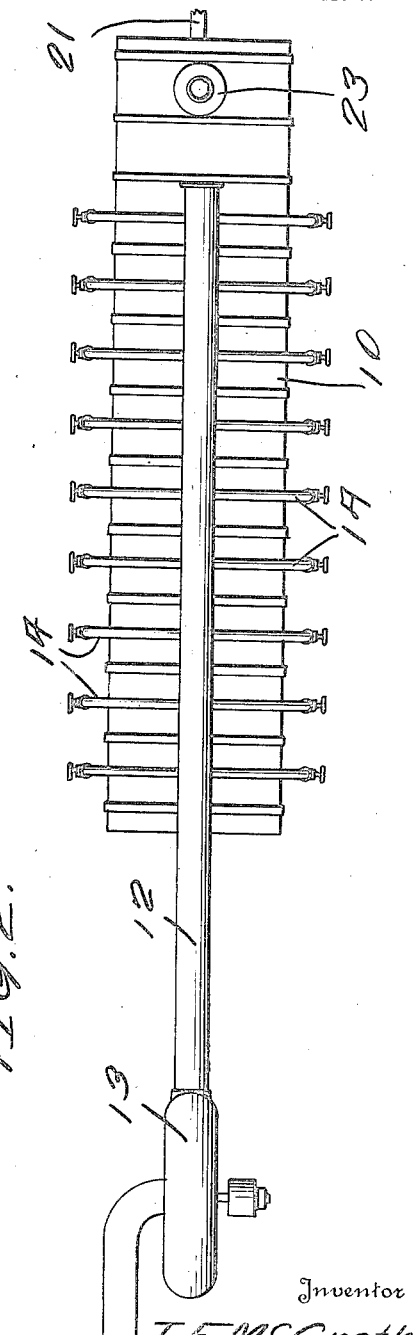

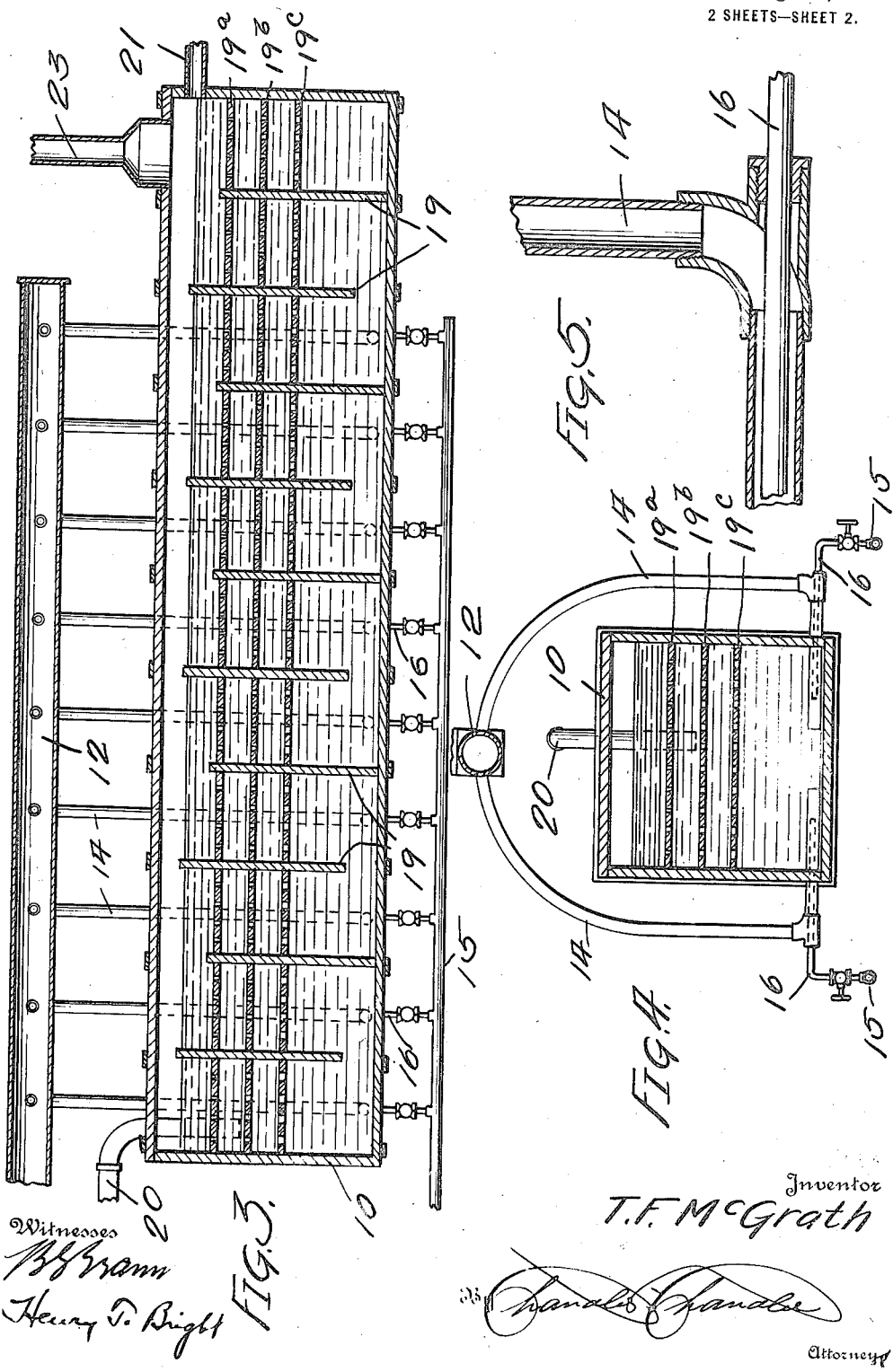

UNITED STATES PATENT OFFICE.

THOMAS F. McGRATH, OF ANACONDA, MONTANA.

APPARATUS FOR EXTRACTING VALUES FROM FLUE-DUST.

1,236,581. Specification of Letters Patent. Patented Aug. 14, 1917.

Application filed February 2, 1915, Serial No. 5,712. Renewed May 16, 1917. Serial No. 169,118.

*To all whom it may concern:*

Be it known that I, THOMAS F. McGRATH, a citizen of the United States, residing at Anaconda, in the county of Deerlodge, State of Montana, have invented certain new and useful Improvements in Apparatus for Extracting Values from Flue-Dust; and I do hereby declare the following to be a full, clear, and exact description of the invention, such as will enable others skilled in the art to which it appertains to make and use the same.

This invention relates to smelting ores and has special reference to treating the fumes, flue dust, smoke and the like which result from the smelting of various ores, metals, and ore derivatives.

The object of the invention is to provide an improved apparatus for treating such by-products as are hereinbefore referred to, such treatment being designed to recover the values contained in such by-products, and leaving the gases clean and non-injurious to animal and vegetable life, thereby serving the double purpose of recovering the mineral values and abating the smoke nuisance.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a side elevation of an apparatus embodying the invention;

Fig. 2, a plan view thereof;

Fig. 3, a longitudinal section of the apparatus;

Fig. 4, a transverse section through the apparatus, and

Fig. 5, a detail section through one of the branch delivery pipes.

In carrying out this invention there is provided a casing or tank 10 which is made of any suitable material depending on the capacity desired. This tank may be lined with a substance which is chemically inert with respect to the material to be treated and the liquid used in the treatment. For instance the tank may be built of brick, cement or iron and the lining may be made of porcelain brick or other light substance.

Above the tank runs a pipe 12 which has included in its length a fan 13. One end of this pipe is connected to the flue (not shown) carrying the waste or by-products which it is desired to treat. The other end of the pipe 12 is closed. Extending laterally from each side of the pipe 12 are spaced delivery pipes 14 which are carried downwardly and then directed inwardly into the tank 10 at the bottom thereof. Running along each side of the tank 10 slightly beneath the bottom thereof are compressed air pipes 15 from which lead branch pipes 16 which extend into the lower portions of respective delivery pipes 14. It will be noted that the lower ends of the pipe 14 terminate short of the center of the tank 10 so that the gases and the like will rise through the solution in the tank in a diffused manner.

Arranged within the tank 10 between the pipes 14 are transverse baffle plates 19 certain of which extend down to the bottom of the tank while the remainder are arranged in spaced relation to the bottom, the plates being arranged alternately in the two positions. These plates are preferably equal in height so that the top edges are disposed in staggered relation.

Between the baffle plates 19 are horizontally arranged screens $19^a$, $19^b$ and $19^c$ which are provided with holes or openings graduated from relatively large openings in the bottom screens to relatively small openings in the top screens.

Leading into the top of the tank adjacent one end is a feed pipe 20 the lower end of which extends well down into the tank. This pipe is used to supply the tank with a suitable solution, which when in excess is drawn off through an overflow pipe 21 located at one end of the tank opposite the pipe 20. Adjacent the overflow pipe 21 and rising from the tank is a waste stack through which the gases escape after the by-products have been treated. It is to be noted that the arrangement of the overflow pipe 21 is such that a constant level of the solution in the tank is maintained and that this level is just below the upper edges of those plates 19 which are spaced from the bottom of the tank.

In operation the products to be treated are forced through the pipe 12 by the fan 13 and thence through the pipes 14 into the tank at a point adjacent the bottom thereof. Compressed air is simultaneously admitted through the pipes 16 and mixed with the products before they enter the tank proper. This compressed air also serves to agitate the solution and bring same into intimate contact with all parts of the products to be treated. By the proper adjustment of the air supply the furnace products may be maintained at the proper temperature to effect oxidization of such of the products as are to be oxidized during their passage through the acid solution. The products pass through the screens 19$^a$, 19$^b$, and 19$^c$ which latter also serve to break such products up and bring same into more intimate contact with the solution. The residual gases then pass out through the stack 23, from which they may be allowed to escape to the open air or they may be led to further similar apparatus for additional treatment. The solution, with the dissolved or combined portion of the treated product is then led off through the pipe 21 when it may be further treated by any of the well known processes to save such of the products dissolved or combined as may be desired. Meanwhile fresh solution is introduced through the pipe 20 and evenly and slowly distributed in the tank by means of the baffles 19, the same flowing under and over the baffles as will be obvious.

It will be obvious that many minor changes may be made in the form and construction of this invention without departing from the material principles thereof. It is not therefore desired to confine the invention to the exact form herein shown and described, but it is wished to include all such as come properly within the scope claimed.

What is claimed is:—

1. The combination with a closed tank, of spaced delivery pipes extending into said tank adjacent the bottom of the latter, means for forcing the products to be treated through said pipes into the tank, means for feeding liquid into the tank at one end and discharging same at the other end, and means for causing the liquid to pursue a tortuous path in its passage through the tank.

2. The combination with a closed tank, of spaced delivery pipes extending into said tank adjacent the bottom of the latter, means for forcing the products to be treated through said pipes into the tank, means for feeding liquid into the tank at one end and discharging same at the other end, and a plurality of baffle plates arranged within the tank in staggered relation whereby the liquid is caused to pursue a tortuous path in its passage through the tank.

3. The combination with a closed tank, of spaced delivery pipes extending into said tank adjacent the bottom of the latter, means for forcing the products to be treated through said pipes into the tank, means for feeding liquid into the tank at one end and discharging same at the other end, a plurality of baffle plates arranged within the tank, and horizontally spaced screen members supported between adjacent baffle plates.

In testimony whereof, I affix my signature, in the presence of two witnesses.

THOMAS F. McGRATH.

Witnesses:
 DE FORREST J. PAYNE,
 WM. N. NELSON.